Sept. 8, 1959 K. M. JONES ET AL 2,903,041
ASSEMBLY FIXTURE
Filed May 17, 1956 2 Sheets-Sheet 1

INVENTORS
K. M. JONES.
J. R. MARCUS
L. R. McCLARY
BY
*W.C. Parnell*
ATTORNEY

Sept. 8, 1959     K. M. JONES ET AL     2,903,041
ASSEMBLY FIXTURE
Filed May 17, 1956     2 Sheets-Sheet 2
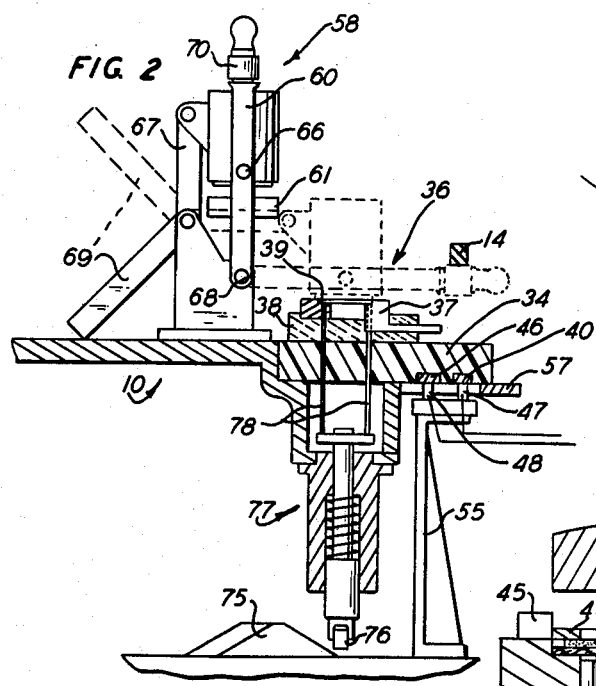
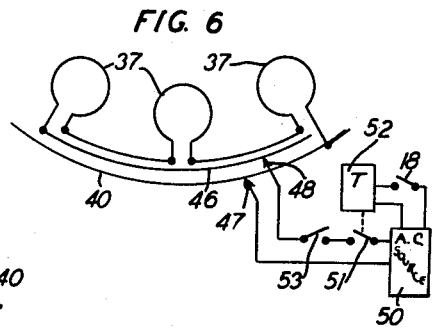
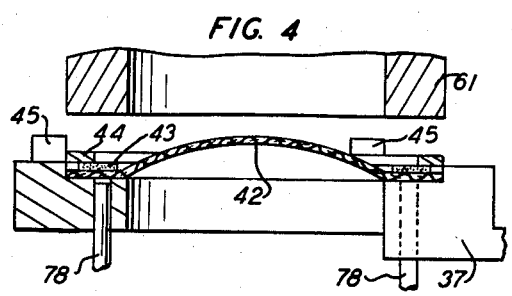
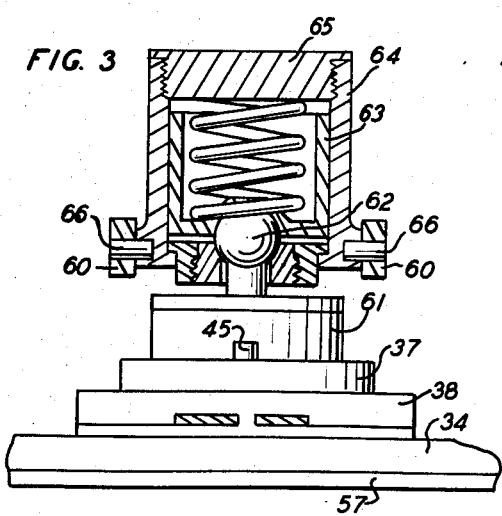
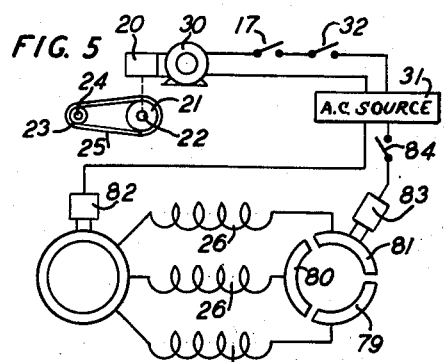
INVENTORS
K. M. JONES
J. R. MARCUS
L. R. McCLARY
BY
ATTORNEY

United States Patent Office 2,903,041
Patented Sept. 8, 1959

2,903,041
ASSEMBLY FIXTURE

Kenneth M. Jones, Indianapolis, Ind., and Jerome R. Marcus, Chicago, and Lee R. McClary, Elmhurst, Ill., assignors to Western Electric Company, Incorporated, New York, N.Y., a corporation of New York Application May 17, 1956, Serial No. 585,532

1 Claim. (Cl. 154—1.6)

This invention relates to an assembly machine and has for its object an improved semi-automatic machine for cementing parts together.

In accordance with the general features of the invention, the machine comprises a stationary structure, a turntable having a plurality of assembly positions and means for moving the parts to be assembled from a loading area, through a clamping and heating area, where the seal is made under pressure, to a removal area where the assemblies are successively ejected from the turntable positions and transferred to a suitable receptacle.

In one embodiment of the invention, each assembly position has a nest for receiving and holding the parts in proper relation to each other with a coating of cement or a suitably shaped cementing member between, a clamp and an induction heating coil for effecting the seal and ejection mechanism for freeing the completed assemblies at the removal area. On the stationary structure a first and second camming rail and an ejector cam control the successive closing of the clamps while the associated coils are energized, the releasing of the clamps and the operation of the ejection mechanisms respectively. A rotating pickup member, driven in synchronism with the turntable, also supported on the stationary structure picks up the cemented parts to remove them from the positions on the turntable.

These and other features of the invention will be more fully understood from the following detailed description taken in conjunction with the accompanying drawing, in which:

Fig. 2 is a side elevational view, partly in section, of a turntable assembly station and a mechanism for lifting cemented parts from the stations;

Fig. 3 is a side elevational view, partly in section, of a parts clamping member as seen along the plane of line 3—3 of Fig. 1;

Fig. 4 is an enlarged cross-sectional view of one of the assembly stations showing parts to be cemeneted positioned therein;

Fig. 5 is a schematic diagram of the turntable drive and the electromagnet pickup circuit; and Fig. 6 is a simplified schematic diagram showing the electrical connections of the heating coils of one group of stations.

Figure 1:
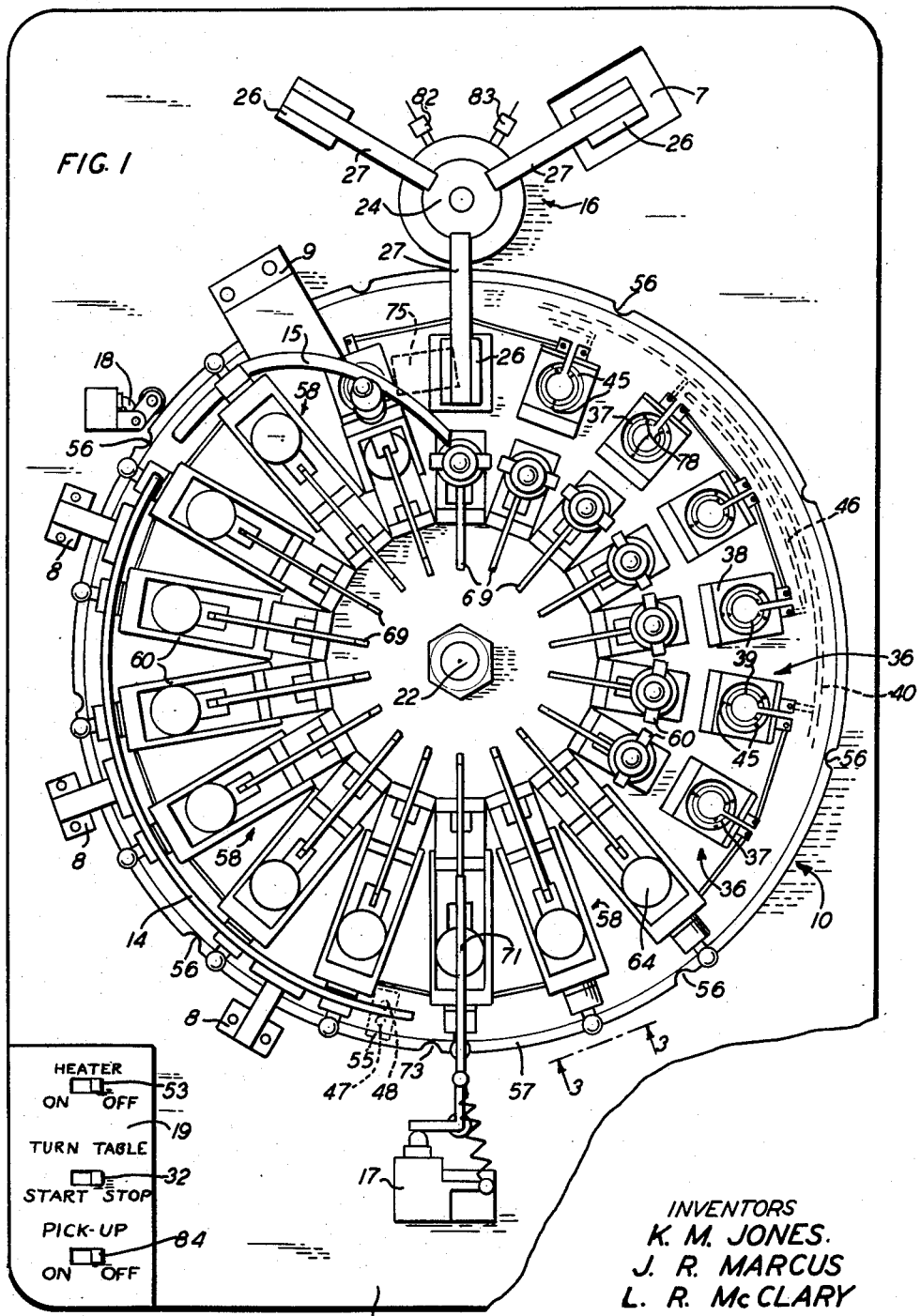
Fig. 1 is a plan view of a machine incorporating the general features of the invention for cementing telephone receiver diaphragms.

In the diaphragm cementing machine as seen in the drawing, an eighteen assembly position turntable 10 is mounted on the top surface 11 of the cabinet 12, which also supports fixed camming rails 14 and 15 by means of brackets 8 and 9, respectively, a rotatable parts pickup and transfer mechanism 16, control switches 17 and 18, and a control panel 19. As the turntable is rotated through 360 degrees, it successively passes through, first, a "loading area" where the operator loads the parts to be cemented into the assembly positions (a supply of parts may be stacked on the top 11 of the cabinet); second, a parts "clamping area" where the parts are heated while held under compression to effect a seal between the parts; third, a "clamp releasing area"; and finally, a parts "removal area" from which the transfer mechanism 16 picks up the cemented parts from the assembly positions and drops them into a removal chute 7.

The central shaft 22 of turntable 10 is driven by a motor 30 housed in the cabinet 12 (shown schematically in Fig. 5) through a gear-reduction unit 20. In order to synchronize the rotation of the transfer mechanism 16 to that of the turntable, the shaft 24 of the transfer mechanism is driven directly by the turntable shaft 22 through sprockets 21 and 23 by means of a belt or chain 25. The turntable and transfer mechanism are driven clockwise and counterclockwise, respectively, as seen in Fig. 1, and the sprockets are proportioned such that successive electromagnets 26, on the three equally spaced arms 27 extending from the shaft 24 of the transfer mechanism, are located over successive assembly positions as they are moved into a removal area. The motor 30 is energized from an A.C. source 31 through a switch 32 on the panel 19 and the control switch 17, the function of which will be discussed below.

The eighteen assembly positions 36 are equally spaced from one another and are mounted on an annular insulating member 34 at the outer periphery of the turntable. Each position includes a flat induction heating coil 37, of substantially 360 degrees, mounted on an insulating member 38, the tops of the coils having annular recesses 39 for receiving and positioning the diaphragms 42 and preformed cementing rings 43. Magnetic annular armature rings 44, which are to be cemented to the diaphragms, are centered on top of the cementing rings by three lugs 45 extending from the coils.

The coils 37 are arranged in six groups of three coils each, which are connected together in series, as shown schematically in Fig. 6. One end of each serially connected group is connected to a common annular slip ring 40 on the bottom of the annular member 34, and the other end is connected to one of six similar arcuate slip ring segments 46 of slight less than 60 degrees each, which are spaced apart and mounted on member 34 around a circle concentric with slip ring 40. Brushes 47 and 48 on a bracket 55 extending from the surface 11 of the cabinet in the "clamping area" thereof (shown in dashed lines in Fig. 1) make electrical contact with the ring 40 and the segments 46 for connecting them to a source 50 of high-frequency heating energy through the contacts 51 of a timer 52 and a switch 53 on control panel 19. The timer 52 is energized to immediately close its contacts 51 when the follower of control switch 18 moves into one of the six depressions 56 which are equally spaced from one another along the outer periphery of a cam ring 57 mounted to the member 34. A predetermined time after the switch 18 is closed, the timer times out and its contacts 51 open to deenergize the heating coils, after they have inductively heated the rings 44.

A clamp 58, for holding the parts under compression while they are being cemented, is provided for each assembly position 36. These clamps include yokes 60 pivotally mounted to the turntable at their lower ends for positioning annular jaws 61 into pressure engagement with the parts located in the assembly positions. The jaws are connected by universal ball joints 62 to tubes 63 mounted slidably in the drums 64 and compression springs 65 press the tubes continuously downwardly. The ball joints permit proper seating of the jaws 61 on the parts. The drums are mounted on the yokes by pivot pins 66. Links 67 are secured pivotally to the drums 64, the length of the links being equal to that between pins 68 mounting the yokes to the turntable and pins 66 so that as the yokes are swung down to clamping position the drums 64 are maintained vertical. The links 67 are provided with extensions 69 which engage the surface of the turntable when the clamps are moved to their open position and therefore keeps the yokes 60 of the clamps in a vertical position. Rollers 70 at the upper or outer end of the yokes engage fixed camming rails 14 and 15 to close and open the clamps respectively. The entrance end 73 of the camming rail is raised to permit the entry of the rollers 70 thereunder after they have been lowered to their clamping positions manually by the operator. In Fig. 2, the dashed lines show one of the clamps held in closed position by the camming rail 14. In the event the yokes are not down in the proper position for pressing the jaws into clamping engagement, they will strike an arm 71 to actuate control switch 17 to stop the drive motor 30 for the turntable to permit the operator to correct the situation. The cam 14 presses the yokes of the clamps downwardly as they travel thereunder so that the assemblages to be cemented together are held under pressure while the heating coils of the assembly positions are energized. Since the timer 52 for the heating coils runs for a definite time and then opens the heating circuit, there is no danger of overheating in the event that the turntable is stopped. The heating cycle is ended while the parts are still held under compression by means of the camming rail 14 and the clamps 58 to permit the melted cement to harden. When the clamps reach the end of the camming rail 14, the rollers 70 thereof engage the top side of the depressed end of the fixed camming rail 15. The rail 15 spirals upwardly so that the clamp 58 is lifted up to its open position by the time it reaches the end of the rail, at which time the assembly position associated therewith is in the "removal area."

As the assembly position is moved into the "removal area," a fixed cam 75 on the surface 11 of the cabinet is engaged by the roller 76 of a normally downwardly biased ejector member 77 mounted on the bottom of the turntable beneath each assembly position. The ejector member controls three ejector pins 78 (of insulating material) which extend into openings through the heating coils. When actuated, the pins 78 lift cemented diaphragm assemblies out of the recesses in the heating coils, so that they may be picked up by the electromagnet members 26 of the transfer member 16. As shown schematically in Fig. 5, members 26 are sequentially energized by means of the common slip ring and slip ring segments 79, 80 and 81 on shaft 24 which are energized by brushes 82 and 83 when a control switch 84 on the control panel 19 is closed. Each magnet is energized only when it moves into position over an assembly position in the removal area to attract the cemented diaphragm and to hold it until it has been moved to a position over the chute 72.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

In a machine for cementing diaphragms to armatures, a fixed support, a turntable rotatable on the support and having a plurality of assembly positions thereon, each position having an induction heating coil with a recess therein for receiving the diaphragms and armatures with preformed cementing members interposed therebetween, a driver for rotating the turntable, a pivotally mounted clamp on the turntable for each of the positions, said clamps being movable from a raised open position, to permit loading the parts into the positions, and a lowered, closed position for engaging parts in the recesses and for clamping the parts together, a first fixed cam mounted to the support alongside the rotary path of the turntable and having a raised entrance end for receiving the clamps in their lowered position and for forcing the clamps downwardly to compress the parts together, driver disabling means, means on the support adjacent the entrance end of the first cam and operable by raised clamps for actuating the disabling means, means for successively energizing the coils while the parts are compressed, a second fixed cam mounted on the support adjacent the exit end of the first cam and having a downwardly depressed entrance end for receiving the lowered clamps after the parts have been compressed for raising the clamps to their open positions, an ejector in each of the positions for lifting cemented parts from the recesses when the clamps have been lifted and magnetic means on the support operable in synchronism with the turntable for removing the lifted parts from the turntable.

References Cited in the file of this patent

UNITED STATES PATENTS

| | | |
|---|---|---|
| 496,399 | Damm | May 2, 1893 |
| 544,656 | Bray | Aug. 20, 1895 |
| 1,305,474 | Lewis | June 3, 1919 |
| 1,492,510 | De Escobales | Apr. 29, 1924 |
| 1,711,978 | Wanders | May 7, 1929 |
| 2,178,990 | Exley | Nov. 7, 1939 |
| 2,432,491 | Thomas | Dec. 9, 1947 |
| 2,449,136 | Pattison | Sept. 14, 1948 |
| 2,752,830 | Randall et al. | July 3, 1956 |